United States Patent
Perez et al.

(10) Patent No.: US 9,749,134 B2
(45) Date of Patent: Aug. 29, 2017

(54) WIRELESS CONFIGURATION USING PASSIVE NEAR FIELD COMMUNICATION

(71) Applicant: QUALCOMM Incorporated, San Diego, CA (US)

(72) Inventors: Aram Perez, San Diego, CA (US); Olivier Jean Benoit, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 14/308,382

(22) Filed: Jun. 18, 2014

(65) Prior Publication Data

US 2014/0376721 A1    Dec. 25, 2014

Related U.S. Application Data

(60) Provisional application No. 61/837,623, filed on Jun. 20, 2013.

(51) Int. Cl.
*H04L 9/30* (2006.01)
*H04W 4/00* (2009.01)
(Continued)

(52) U.S. Cl.
CPC .............. *H04L 9/30* (2013.01); *H04L 9/3226* (2013.01); *H04W 4/008* (2013.01); *H04W 12/04* (2013.01);
(Continued)

(58) Field of Classification Search
CPC ........................................................ H04L 9/30
(Continued)

(56) References Cited

U.S. PATENT DOCUMENTS 7,350,076 B1    3/2008  Young et al.
8,001,584 B2    8/2011  Lortz et al.
(Continued)

FOREIGN PATENT DOCUMENTS

EP    1881663 A1    1/2008
EP    1898570 A1    3/2008
(Continued)

OTHER PUBLICATIONS

Co-pending U.S. Appl. No. 61/613,438, filed Mar. 20, 2012, 22 pgs.
(Continued)

*Primary Examiner* — William Powers
(74) *Attorney, Agent, or Firm* — Holland & Hart LLP

(57) ABSTRACT

A system comprises an access point and a client device. The access point receives, using near field communication (NFC) technology, a public key associated with the client device and sends, using NFC technology, a public key associated with the access point. The access point further encrypts configuration data associated with a network and sends the encrypted configuration data to the client device. The client device receives, using NFC technology, a command indicating that a public key associated with the client device is to be sent to the access point and sends, using NFC technology, the public key to the access point. The client device further receives, using NFC technology, a public key associated with the access point and configures the client device to wirelessly connect to a network associated with the access point.

30 Claims, 9 Drawing Sheets

(51) Int. Cl.
*H04W 12/04* (2009.01)
*H04W 12/06* (2009.01)
*H04L 9/32* (2006.01)
*H04L 9/08* (2006.01)

(52) U.S. Cl.
CPC ........... *H04W 12/06* (2013.01); *H04L 9/0811* (2013.01); *H04L 2209/24* (2013.01); *H04L 2209/80* (2013.01); *H04L 2209/805* (2013.01)

(58) Field of Classification Search
USPC ........................................................ 380/270
See application file for complete search history.

(56) References Cited

U.S. PATENT DOCUMENTS

| | | | |
|---|---|---|---|
| 8,364,963 B2 | 1/2013 | Lind et al. | |
| 8,583,915 B1 | 11/2013 | Huang | |
| 2004/0258032 A1* | 12/2004 | Kawamura | H04W 8/26 370/338 |
| 2005/0100166 A1* | 5/2005 | Smetters | H04L 63/0492 380/277 |
| 2006/0291663 A1* | 12/2006 | Aissi | H04L 9/0825 380/285 |
| 2007/0206786 A1* | 9/2007 | Chakraborty | H04L 63/0442 380/30 |
| 2007/0229216 A1* | 10/2007 | Yasuda | G05B 23/0289 340/3.42 |
| 2008/0065877 A1* | 3/2008 | Son | H04L 63/0428 713/151 |
| 2008/0081608 A1* | 4/2008 | Findikli | H04M 1/7253 455/425 |
| 2009/0222659 A1 | 9/2009 | Miyabayashi et al. | |
| 2009/0227282 A1* | 9/2009 | Miyabayashi | H04L 63/0492 455/552.1 |
| 2010/0167643 A1* | 7/2010 | Hirsch | H04L 63/18 455/41.1 |
| 2010/0318795 A1 | 12/2010 | Haddad et al. | |
| 2011/0028091 A1* | 2/2011 | Higgins | H04L 63/0492 455/41.2 |
| 2011/0116631 A1 | 5/2011 | Shon et al. | |
| 2011/0210831 A1 | 9/2011 | Talty et al. | |
| 2011/0275316 A1 | 11/2011 | Suumaeki et al. | |
| 2012/0077432 A1 | 3/2012 | Rose et al. | |
| 2012/0167176 A1 | 6/2012 | Hwang et al. | |
| 2012/0214472 A1* | 8/2012 | Tadayon | H04B 5/0062 455/418 |
| 2013/0070926 A1* | 3/2013 | Eun | H04L 9/0825 380/270 |
| 2013/0254519 A1 | 9/2013 | Benoit et al. | |
| 2014/0006773 A1* | 1/2014 | Chazalet | H04L 63/0428 713/150 |
| 2014/0047510 A1 | 2/2014 | Belton et al. | |
| 2014/0075523 A1* | 3/2014 | Tuomaala | H04L 63/083 726/6 |

FOREIGN PATENT DOCUMENTS

EP 1993301 A1 11/2008
GB 2411086 B 12/2006

OTHER PUBLICATIONS

Co-pending U.S. Appl. No. 61/637,234, filed Apr. 23, 2012, 60 pgs.
"Wi-Fi Protected Access (WPA) in a Cisco Unified Wireless Network Configuration Example", Cisco Systems, Inc., Document ID 100708, 2012-2013, Updated Feb. 26, 2008, 24 pages.
ISA/EPO, International Search Report and Written Opinion of the International Searching Authority, Int'l App. No. PCT/US2014/043225, dated Oct. 17, 2014, European Patent Office, Rijswijk, NL, 13 pgs.
Wi-Fi Alliance, "Wi-Fi Certified™ for Wi-Fi Protected Setup: Easing the User Experience for Home and Small Office Wi-Fi® Networks," internet citation, 2007, pp. 1-16, XP002567243, downloaded from http://www.wi-fi.org/wp/wifi-protected-setup.

* cited by examiner

WIRELESS CONFIGURATION USING PASSIVE NEAR FIELD COMMUNICATION

CROSS REFERENCES

The present Application for Patent claims priority to U.S. Provisional Patent Application No. 61/837,623 by Perez et al., entitled "Wireless Configuration Using Passive Near Field Communication," filed Jun. 20, 2013, assigned to the assignee hereof.

BACKGROUND

Embodiments of the subject matter generally relate to the field of network devices, and, more particularly, to wireless setup between network devices.

Near field communication (hereinafter "NFC") technology is a set of standards for allowing communication between compatible devices initiated by bringing the compatible devices into close proximity of each other. NFC may be implemented using radio frequency (hereinafter RF) technology. NFC may be implemented actively or passively. Active NFC includes hardware that transmits an RF signal using a connected power source. Passive NFC, on the other hand, does not have a connected power source, instead relying on power generated from a received RF signal.

An RF signal is an electromagnetic field that may be converted into an electric current. When an active NFC device transmits an RF signal to a passive NFC device, the passive NFC device converts the RF signal into an electric current. The passive NFC device uses the power from the electric current to power the embedded circuitry. The RF signal from the active NFC device provides enough power for the passive NFC device to receive, decode, and process the RF signal, as well as perform any actions specified by a command encoded in the RF signal. The passive NFC device may also utilize the power generated by the RF signal to transmit a response to the active NFC device.

NFC technology has many uses, including data transmission between devices, contactless payment systems, etc. NFC technology may also be combined with Wi-Fi Protected Setup (hereinafter "WPS") for configuring wireless devices to connect to wireless networks. WPS increases the ease of setting up a secure wireless connection between two wireless devices, such as an access point and a laptop computer. For example, when configuring a wireless device to connect to a wireless network, the configuration information, including a network password or key corresponding to the wireless network is entered using software on the wireless device. WPS provides for several mechanisms that allow the wireless device and access point to communicate the configuration data without the user needing to know or enter a potentially long and cumbersome password or key. For example, a button may be pressed on an access point and on the wireless device, either at the same time or within a short period of time. The access point then communicates the configuration data for the secure wireless network to the wireless device, thus allowing the wireless device to configure itself for access to the wireless network.

WPS provides another mechanism for configuration of a device that uses NFC by allowing the configuration data to be transferred using NFC. For example, an NFC-enabled smartphone may be placed in close proximity to an access point. The smartphone and access point then use NFC to communicate the configuration data, such as the password or key. Both devices communicate using active NFC implementations.

SUMMARY

The described features generally relate to wireless configuration using passive near field communication. In one example, a device includes a near field communication control unit and an access point control unit coupled with the near field communication control unit. The near field communication control unit may receive, using near field communication technology, a public key associated with a wireless device and send, using near field communication technology, a public key associated with the device. The access point control unit may encrypt configuration data associated with a network. The device operates as an access point for the network. The access point control unit may further send the encrypted configuration data associated with the network to the wireless device.

In one set of illustrative examples, a method for wireless configuration is described. In one configuration, the method includes receiving, by a first device using near field communication technology, a command indicating that a public key associated with the first device is to be sent to a second device. The method further includes sending, from the first device to the second device using near field communication technology, the public key associated with the first device. The method further includes receiving, by the first device using near field communication technology, a public key associated with the second device. The method further includes configuring the first device to wirelessly access a network associated with the second device.

In some examples of the method, configuring the first device to wirelessly access the network associated with the second device includes receiving, by the first device, authentication data associated with the network, and configuring the first device to wirelessly connect to the network based, at least in part, on the authentication data. In these examples, the authentication data is encrypted using the public key associated with the first device. In some examples, the authentication data is encrypted using a shared secret key derived from at least the public key associated with the first device. In some examples, the authentication data includes at least one of a username, or a password, or an encryption key, or a pre-shared key, or a combination thereof.

In some examples, configuring the first device to wirelessly connect to the network includes decrypting, by the first device, the authentication data associated with the network, encrypting, by the first device, a message using the public key associated with the second device, and sending, from the first device, the encrypted message. In these examples, the authentication data is decrypted using a private key associated with the first device. In some examples, the authentication data is decrypted using a shared secret key, the message is encrypted using the shared secret key, and the shared secret key is derived from at least the public key associated with the second device.

In some examples, configuring the first device to wirelessly access the network associated with the second device includes generating, by the first device, authentication data associated with the network, and generating, by the second device, the authentication data associated with the network. In these examples, the first authentication data is generated by the first device based at least in part on the public key associated with the second device, and the second authentication data is generated by the second device based at least in part on the public key associated with the first device.

In some examples, configuring the first device to access the network associated with the second device includes receiving, by the first device, configuration data associated with a third device, configuring the first device to connect to the third device, receiving, by the first device, configuration data associated with the second device, and configuring the first device to wirelessly access the network associated with the second device, based, at least in part, on the configuration data associated with the second device.

In some examples, the first device is powered, at least in part, by a radio frequency signal transmitted by the second device. In some examples, the public key associated with the second device is received from a third device, and the public key associated with the first device is sent to the third device. In some examples, the first device includes a near field communication tag and a wireless control unit. In some examples, sending, from the first device to the second device using near field communication technology, the public key associated with the first device includes transmitting, by the near field communication tag, the public key associated with the first device. In these examples, the near field communication tag is powered by the second device. In some examples, receiving, by the first device using near field communication technology, the public key associated with the second device includes writing the public key associated with the second device to memory on the near field communication tag.

In another set of illustrative examples, a device is described. In one configuration, the device includes a near field communication tag to receive, using near field communication technology, a command indicating that a public key associated with the device is to be sent to a wireless device. The near field communication tag further sends, using near field communication technology, the public key associated with the device to the wireless device. The near field communication tag further receives, using near field communication technology, a public key associated with the wireless device. The device further includes a wireless control unit to wirelessly connect to a network associated with the wireless device. The wireless control unit is coupled with the near field communication tag.

In some examples, the wireless control unit configures the device to wirelessly connect to the network associated with the wireless device by receiving authentication data associated with a network, and configuring the device to wirelessly connect to the network based, at least in part, on the authentication data. In these examples, the authentication data is encrypted using the public key associated with the device. In some examples, the authentication data is encrypted using a shared secret key derived from at least the public key associated with the first device. In some examples, the authentication data includes at least one of a username, or a password, or an encryption key, or a pre-shared key, or a combination thereof.

In some examples, the wireless control unit configures the device to wirelessly connect to the network associated with the wireless device by decrypting the authentication data associated with the network, encrypting a message using the public key associated with the wireless device, and sending the encrypted message. In these examples, the authentication data is decrypted using a private key associated with the device. In some examples, the authentication data is decrypted using a shared secret key, the message is encrypted using the shared secret key, and the shared secret key is derived from at least the public key associated with the second device.

In some examples, the wireless control unit configures the device to wirelessly connect to the network associated with the wireless device by generating authentication data associated with the network. In these examples, the authentication data is generated based at least in part on the public key associated with the second device. In some examples, the wireless control unit configures the device to wirelessly connect to the network associated with the wireless device by receiving configuration data associated with a third device, configuring the device to connect to the third device, receiving configuration data associated with the wireless device, and configuring the device to wirelessly access the network associated with the wireless device, based, at least in part, on the configuration data associated with the wireless device.

In some examples, the near field communication tag is powered by the wireless device. In some examples, the near field communication tag writes the public key associated with the wireless device to memory on the near field communication tag. In some examples, the wireless control unit reads the public key associated with the wireless device from the near field communication tag. In some examples, the wireless control unit writes the public key associated with the device to the near field communication tag.

In another set of illustrative examples, a device is described. In one configuration, the device includes means for receiving, using near field communication technology, a command indicating that a public key associated with the device is to be sent to a wireless device. The device further includes means for sending, using near field communication technology, the public key associated with the device to the wireless device. The device further includes means for receiving, using near field communication technology, a public key associated with the wireless device. The device further includes means for configuring the device to wirelessly access a network associated with the wireless device.

In some examples, the means for configuring the device to wirelessly access the network associated with the wireless device includes means for receiving authentication data associated with the network, and means for configuring the device to wirelessly connect to the network based, at least in part, on the authentication data. In these examples, the authentication data is encrypted using the public key associated with the device. In some examples, the means for configuring the device to wirelessly access the network associated with the wireless device includes means for decrypting the authentication data associated with the network, means for encrypting a message using the public key associated with the wireless device, and means for sending the encrypted message. In these examples, the authentication data is decrypted using a private key associated with the device.

In another set of illustrative examples, a computer program product including a non-transitory computer-readable medium storing instructions executable by a processor is described. In one configuration, the instructions are executable by the processor to receive, using near field communication technology, a command indicating that a public key associated with a first device is to be sent to a second device, send, using near field communication technology, the public key associated with the first device to the second device, receive, using near field communication technology, a public key associated with the second device, and configure the first device to wirelessly access a network associated with the second device.

In some examples, the instructions executable by the processor to configure the device to wirelessly connect to the network associated with the wireless device further include instructions executable by the processor to receive authentication data associated with the network, and configure the first device to wirelessly connect to the network based, at least in part, on the authentication data. In these examples, the authentication data is encrypted using the public key associated with the first device.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The present embodiments may be better understood, and numerous objects, features, and advantages made apparent to those skilled in the art by referencing the accompanying drawings.

DETAILED DESCRIPTION

Figure 1:
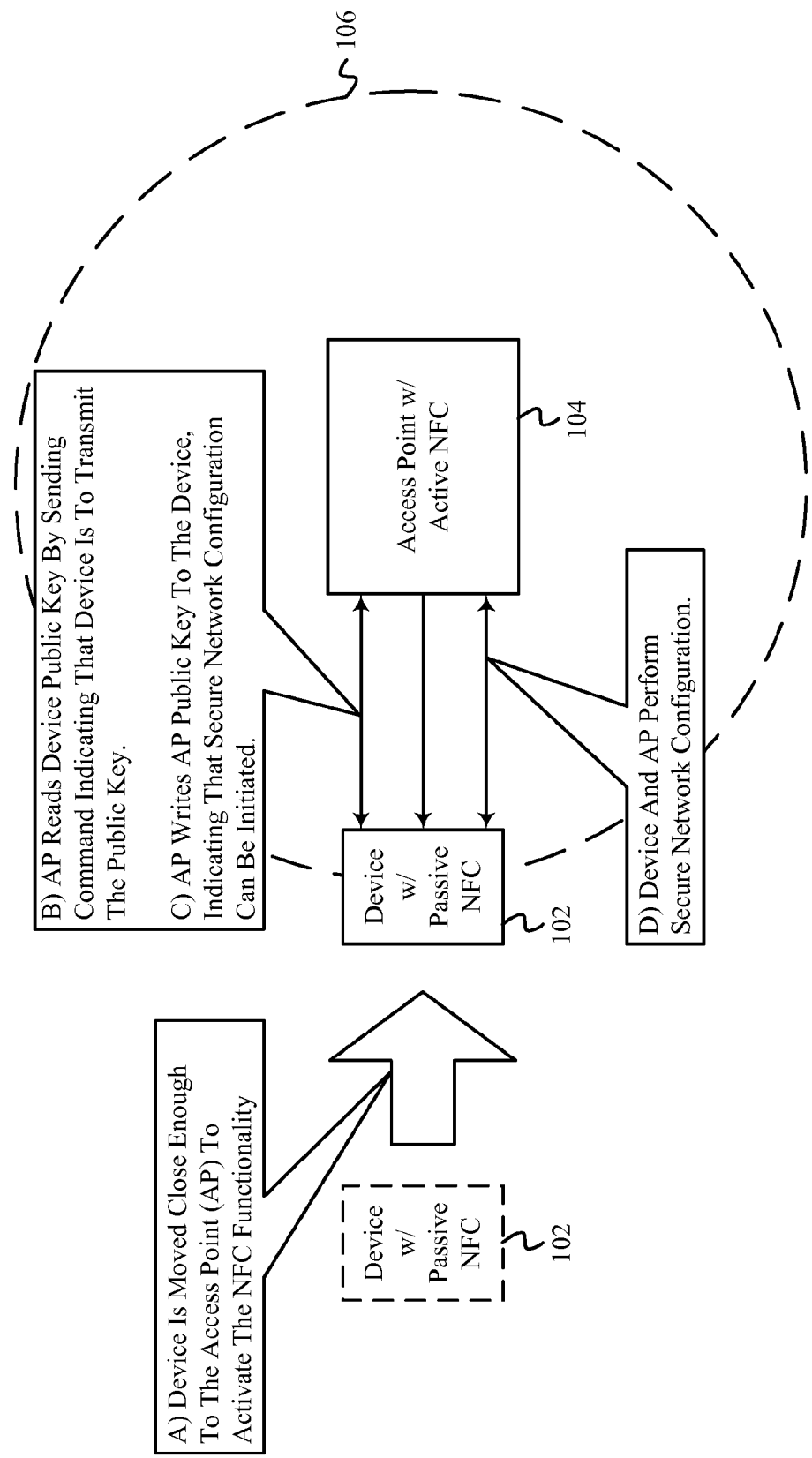
FIG. 1 depicts a set of NFC-enabled wireless devices capable of utilizing NFC to securely facilitate network configuration.

The description that follows includes example systems, methods, techniques, instruction sequences and computer program products that embody techniques of the present subject matter. However, it is understood that the described embodiments may be practiced without these specific details. For instance, although examples refer to Wi-Fi Protected Setup (WPS), the subject matter can also apply to other methods of pairing or configuring two wireless devices to interoperate. In other instances, well-known instruction instances, protocols, structures and techniques have not been shown in detail in order not to obfuscate the description.

Terminology

The term "NFC device" is used to refer to a device that implements an NFC standard and includes a power source for the communication of NFC signals, thus making an NFC device an active NFC implementation. The term "NFC tag," on the other hand, refers to the specific hardware that implements an NFC standard and does not include a power source for the communication of NFC signals, thus making an NFC tag a passive NFC implementation. The terms "active" and "passive" will be used to describe NFC devices and devices that include NFC tags, respectively. Thus, any reference to a "device," unless otherwise specified, indicates a device that implements either active or passive NFC technology, as appropriate for the specific embodiment or implementation discussed.

The term "connected" can mean directly or indirectly coupled as well as communicatively or physically coupled. For example, a first computing system and a second computing system are each physically coupled to the router by networking cables. Because the router allows the first computing system to communicate with the second computing system, the two computing systems are communicatively coupled. Further, a third computing system is connected to the router via a wireless connection, thus making the third computing system and router communicatively coupled. Further, a first component that is "connected" to a second component can be integrated into the second component, or vice versa. Thus, an NFC tag that is connected to a wireless device may be integrated into the wireless device itself. Components that are connected need not be within close proximity to each other. For example, two computing systems may be connected via the Internet while being thousands of miles apart.

Overview

NFC can be utilized in such a way that a passive NFC device can be used to facilitate configuration of a client with an access point via an active NFC device of the access point. The passive NFC device has lower cost and consumes less power than an active NFC device. Public key cryptography can be used to prevent eavesdropping on the exchange of information between the NFC devices. Both the active NFC device of the access point and the passive NFC device of the client may have public-private cryptographic key pairs. The active NFC device reads the public key associated with the passive NFC device from the passive NFC device. The active NFC device then writes the public key associated with the active NFC device to the passive NFC device. Once the active NFC device's public key is written to the passive NFC device, the client and the access point may securely exchange configuration information. Additionally, the key exchange may be combined with WPS to perform the configuration of the client.

NFC-Facilitated Network Configuration Example Illustrations

FIG. 1 depicts an embodiment of a set of NFC-enabled wireless devices capable of utilizing NFC to securely facilitate network configuration. FIG. 1 depicts the set of NFC-enabled devices, including a device 102 with passive NFC capability (hereinafter "client") and an access point 104 with active NFC capability (hereinafter "AP"). The range within which a passive NFC capable client may trigger the NFC capabilities of the AP 104 is indicated by the dotted line 106. The client 102 and the AP 104 may each be associated with a public-private key pair (not depicted).

At stage A, the client 102 is moved into the range 106 within which the AP 104 NFC capabilities are triggered. The specific range 106 may vary between implementations. For example, in some implementations the range may be a few centimeters, while in some implementations the range 106 is small enough that the client 102 physically touches the AP 104. The range 106 may be defined by the particular NFC standard implemented or vary due to design considerations. For example, if reducing power consumption is a design goal, the amount of power available to transmit a signal may be limited, thus reducing the range 106. As a device with active NFC capabilities, the AP 104 generates an RF field that, once a passive NFC device is within range, provides power for the passive NFC device. Thus, when a passive NFC device, such as the client 102, enters the RF field generated by the AP 104, the passive NFC device may communicate with the AP 104.

At stage B, the AP 104 reads the public key associated with the client 102 from the client 102. To read data from a passive NFC device such as the client 102, the AP 104 encodes a command and transmits the command using an RF signal. The client 102 receives the RF signal, and utilizing the power generated by the RF signal, decodes the command. Further using the power generated by the RF signal, the client 102 transmits the public key.

At stage C, the AP 104 writes the public key associated with the AP 104 to the client 102. To write the AP 104 public key to the client 102, the AP 104 encodes a write command, as well as the data to write, and transmits the encoded command and data as an RF signal, or as a set of RF signals, to the client 102. The client 102 utilizes the power generated by the RF signal to decode the command and data, writing the AP 104 public key to memory accessible to the client 102.

At stage D, the client 102 and AP 104 perform a secure network configuration. The client 102 may be implemented such that the client 102 begins the secure network configuration in response to receiving the AP 104 public key. Thus, the receipt of the AP 104 public key may act as the indication that a secure network configuration setup can begin. In some implementations, another command transmitted by the AP 104 indicates that the secure network configuration can begin. In some implementations, the indication may come from another source, such as from a user interacting with a user interface associated with the client 102 or AP 104.

To perform the secure network configuration using the exchanged public keys, the client 102 uses the AP 104 public key to encrypt the communications transmitted to the AP 104. Similarly, the AP 104 uses the client 102 public key to encrypt the communications transmitted to the client 102. Because the respective devices encrypt the data using the public keys, the data may only be decrypted by the private key associated with the other device. Thus, sensitive data, such as the password or key used to access the wireless network, may be passed securely over an otherwise insecure wireless network. In other words, even if an unauthorized third party receives the encrypted data, the unauthorized third party cannot decrypt the data. Some implementations encrypt all configuration-related communications between the client 102 and the AP 104. Some implementations encrypt a subset of the configuration-related communications, such as messages containing sensitive data. In some implementations, both the client 102 and the AP 104 derive a shared secret key from the public keys exchanged using an algorithm such as the Diffie-Hellman key exchange or Elliptic Curve Diffie-Hellman. The shared secret key, derived from the public keys, is used for the data encryption and decryption.

Because the client 102 implements passive NFC capabilities, the client 102 may not need power to receive the AP 104 public key. For example, the client 102 may be a wireless capable video camera and the AP 104 may be implemented in a digital video recorder. The video camera connects with the digital video recorder wirelessly. To begin configuration of the video camera, a user touches the video camera to the digital video recorder. The public keys associated with the video camera and digital video recorder are exchanged as described above. The video camera is placed in a desired location that may be some distance away from the digital video recorder. For example, the video camera might be placed outside of a house to act as a security camera, while the digital video recorder remains inside the house. Once the video camera is placed in the desired location and connected to a power source, the video camera uses the digital video recorder public key, which is now stored on an NFC tag embedded in the video camera, to initiate and perform a secure network configuration with the digital video recorder.

The client 102 and the AP 104 may be implemented such that the public keys alone are used to encrypt communication between the client 102 and the AP 104, as described above. The security of the communications may further be enhanced by each device signing the communications using their respective private keys. For example, the AP 104 uses the client 102 public key to encrypt a configuration-related communication. The AP 104 then may use the AP 104 private key to sign the communication. The AP 104 signature may be derived from the communication using a known technique, such as a digital signature function known to both the AP 104 and the client 102. The signature may then be generated using the AP 104 private key. The client 102 may then receive the configuration-related communication and decrypt it using the client 102 private key. The client 102 then may verify the related signature by using the AP 104 public key.

Further, the NFC public key exchange may be combined with WPS. The public key exchange facilitates the generation of a "shared secret" key, such as used in a Diffie-Hellman key exchange or Elliptic Curve Diffie-Hellman. Thus, once the public keys are exchanged, the client 102 and the AP 104 may perform a WPS or otherwise utilize symmetric key cryptography. In a Diffie-Hellman key exchange, and other similar cryptography implementations, the client 102 combines the AP 104 public key with the client 102 private key and with a random number generated by the AP 104. The combination produces a shared secret. Similarly, the AP 104 combines the client 102 public key with the AP 104 private key and with a random number generated by the client 102, producing the same shared secret as produced by the combination of the client 102 private key, AP 104 public key and random number. Communications between the client 102 and AP 104 are then encrypted using the shared secret as an encryption key or from an encryption key derived from the shared secret, which may only be decrypted using the same shared secret, available both to the client 102 and AP 104. Some implementations of WPS utilize a Diffie-Hellman (or similar) key exchange, thus allowing the NFC public key exchange to facilitate the use of WPS.

Figure 2:
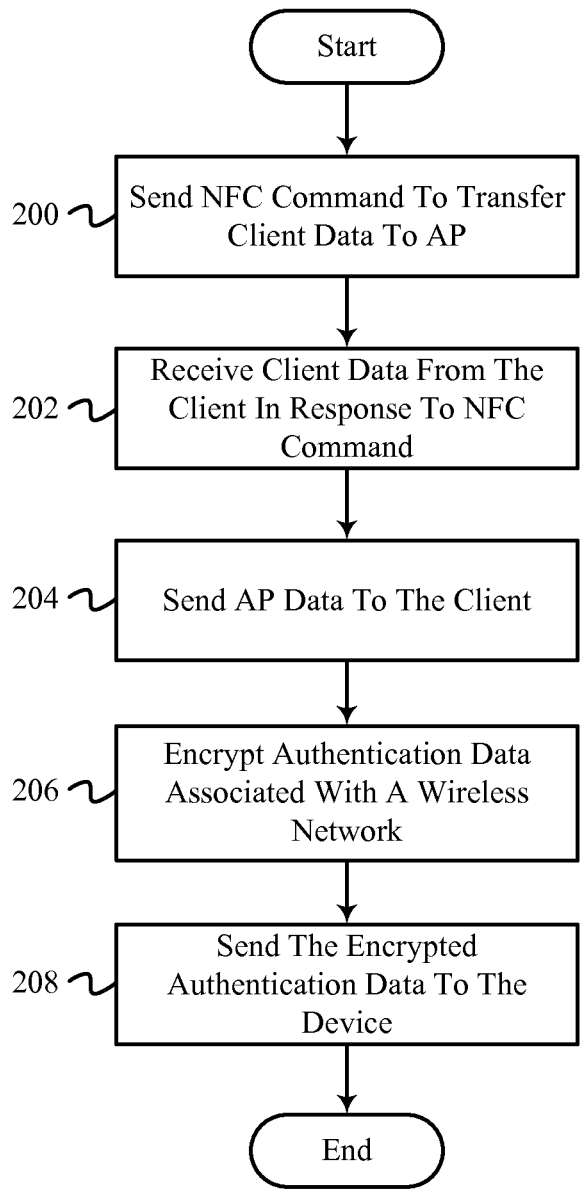
FIG. 2 depicts a flowchart of example operations for utilizing NFC to facilitate secure network configuration at an AP.

FIG. 2 depicts a flowchart of example operations for utilizing NFC to facilitate secure network configuration at an AP. The AP interacts with a client that implements passive NFC and is within range of the AP's active NFC capabilities. The AP and client described below may be examples of at least one aspect of the AP and client described with reference to FIG. 1.

At block 200, an AP sends an NFC command indicating that the client within range is to transfer the client data associated with the client to the AP. The NFC command may be sent in response to receiving an indication from the client that the client is in range. The NFC command may also be broadcast continuously or periodically. After the AP sends the NFC command indicating that the client's public key should be transferred, control then flows to block 202.

At block 202, the AP receives client data from a client. The client data includes a client identifier and a public key. The client data may include other data, such as what protocols the client is compatible with. The client identifier may be a randomly generated value, a MAC (media access control) address, the public key, etc. The client transmits the data representing the public key associated with the client. The AP receives and processes the data. The AP then saves the client data to memory. After the AP receives the client data, control then flows to block 204.

At block 204, the AP sends AP data to the client. The AP data includes a public key associated with the AP. The AP data may also include other data, such as a service set identifier (SSID) to use when connecting to the AP. The AP transmits the AP data to the client. The client receives and processes the AP data. The client then saves the AP data to memory. After the AP sends the public key associated with the AP to the client, control then flows to block 206.

At block 206, the AP encrypts authentication data associated with a network using the public key associated with the client. The AP is an access point of the network, and the authentication data is used in wirelessly connecting the client to the network. Encrypting the authentication data with the client's public key allows the data to be communicated with the client securely. In some implementations, as described above, instead of using the client's public key directly, a shared secret key derived from the client's public key and the AP's public key is used to encrypt the authentication data. After the AP encrypts authentication data associated with the wireless network, control then flows to block 208.

At block 208, the AP sends the encrypted authentication data to the client. The wireless network used to send the encrypted authentication data may be the wireless network associated with the authentication data or a separate wireless network. After sending the encrypted authentication data to the client, the process ends.

Figure 3:
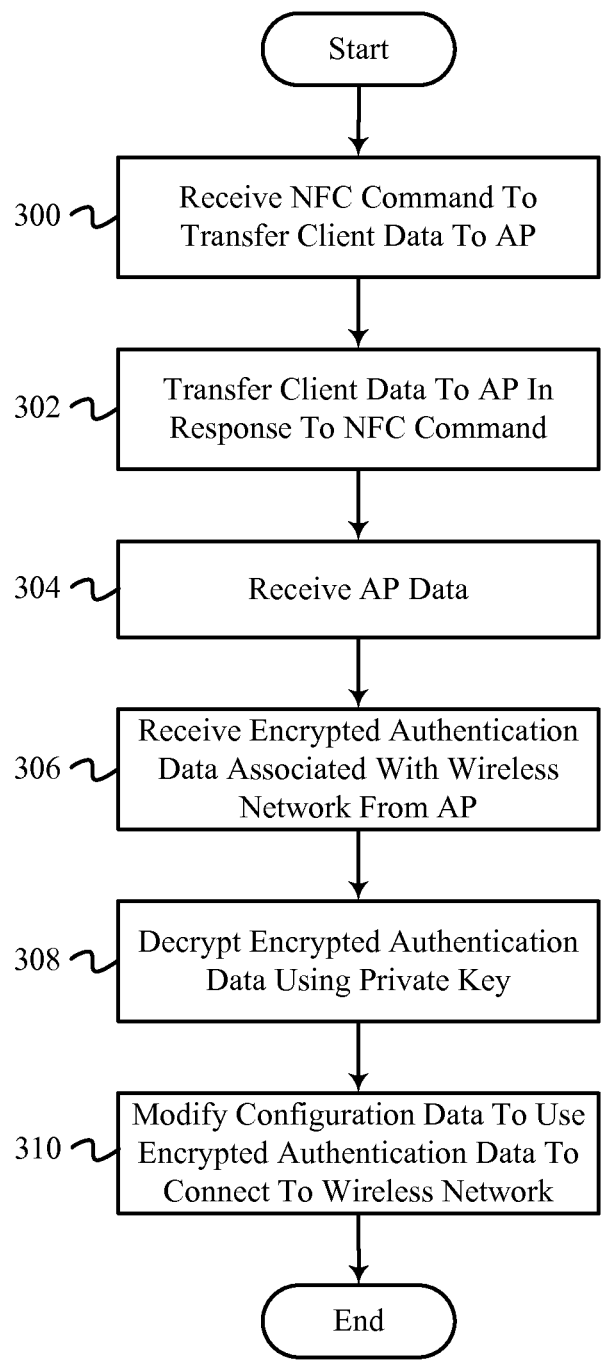
FIG. 3 depicts a flowchart of example operations for utilizing NFC to facilitate secure network configuration at a client that implements passive NFC.

FIG. 3 depicts a flowchart of example operations for utilizing NFC to facilitate secure network configuration at a client that implements passive NFC. The AP and client described below may be examples of at least one aspect of the AP and client described with reference to FIGS. 1 and/or 2.

At block 300, the client receives from the AP a transmission that includes an NFC command indicating that client data should be transferred to the AP. The client receives the NFC command by deriving power from the AP transmission. After the client receives the NFC command, control then flows to block 302.

At block 302, the client transfers client data to the AP. The client data, as described includes a client identifier and a public key, as well as other data. The client emits an RF field that includes the client data. The power for the emitting is derived from the RF signals received from the AP. After the client communicates the client data to the AP, control then flows to block 304.

At block 304, the client receives AP data. The AP data, as discussed above, includes a public key, and may include other data. The AP transmits the AP data by transmitting an RF field that includes the AP data. The transmission also indicates that the AP data is to be written to memory. After the client receives the AP data, control then flows to block 306.

At block 306, the client receives encrypted authentication data associated with a wireless network from the AP. The network used to transmit the data may be the network associated with the authentication data or a separate network. The encrypted authentication data is encrypted using the client's public key or a shared secret key derived from the client's and AP's public keys. After the client receives the encrypted authentication data, control then flows to block 308.

At block 308, the client decrypts the encrypted authentication data using the private key associated with the client or the shared secret key. Because the encrypted authentication data was encrypted using the client's public key or the shared secret key, the client may decrypt the data using the client's private key or the shared secret key. After the client decrypts the encrypted authentication data, control then flows to block 310.

At block 310, the client modifies configuration data to use the authentication data to connect to the network. The authentication data may include data such as a password or key that is used to login to the network. The client uses the authentication data to securely join the network without a user entering the configuration data. After the client modifies the configuration data, the process ends.

While the above flowcharts describe the AP communicating the authentication data to the client, in some implementations, the client may generate the authentication data associated with the network. The client may generate the authentication data based on the public key associated with the AP. The client may receive the public key associated with the AP in the AP data received at block 304. The AP may also generate authentication data associated with the network. The AP may generate the authentication data based on the public key associated with the client. The AP may receive the public key associated with the client in the client data transferred to the AP in block 302.

Further, additional communications may be sent between the AP and the client. For example, in some implementations, the client may send an initial communication to the AP requesting authentication data from the AP. In some implementations, the AP periodically transmits a message to any client within range, providing basic data that allows a client to then request authentication data. Further, although the above flowchart describes the AP providing authentication data to the client, additional data may be exchanged between the client and the AP. Any additional data may be exchanged along with the authentication data or separately.

In order to keep from obfuscating the embodiments described, the descriptions hereinafter will describe utilizing the exchanged public keys to encrypt communications between devices to exchange configuration data. However, the embodiments hereinafter may also use shared secret keys for encryption, as described above. Relatedly, the embodiments hereinafter may also utilize WPS to accomplish the configuration of the client.

Figure 4:
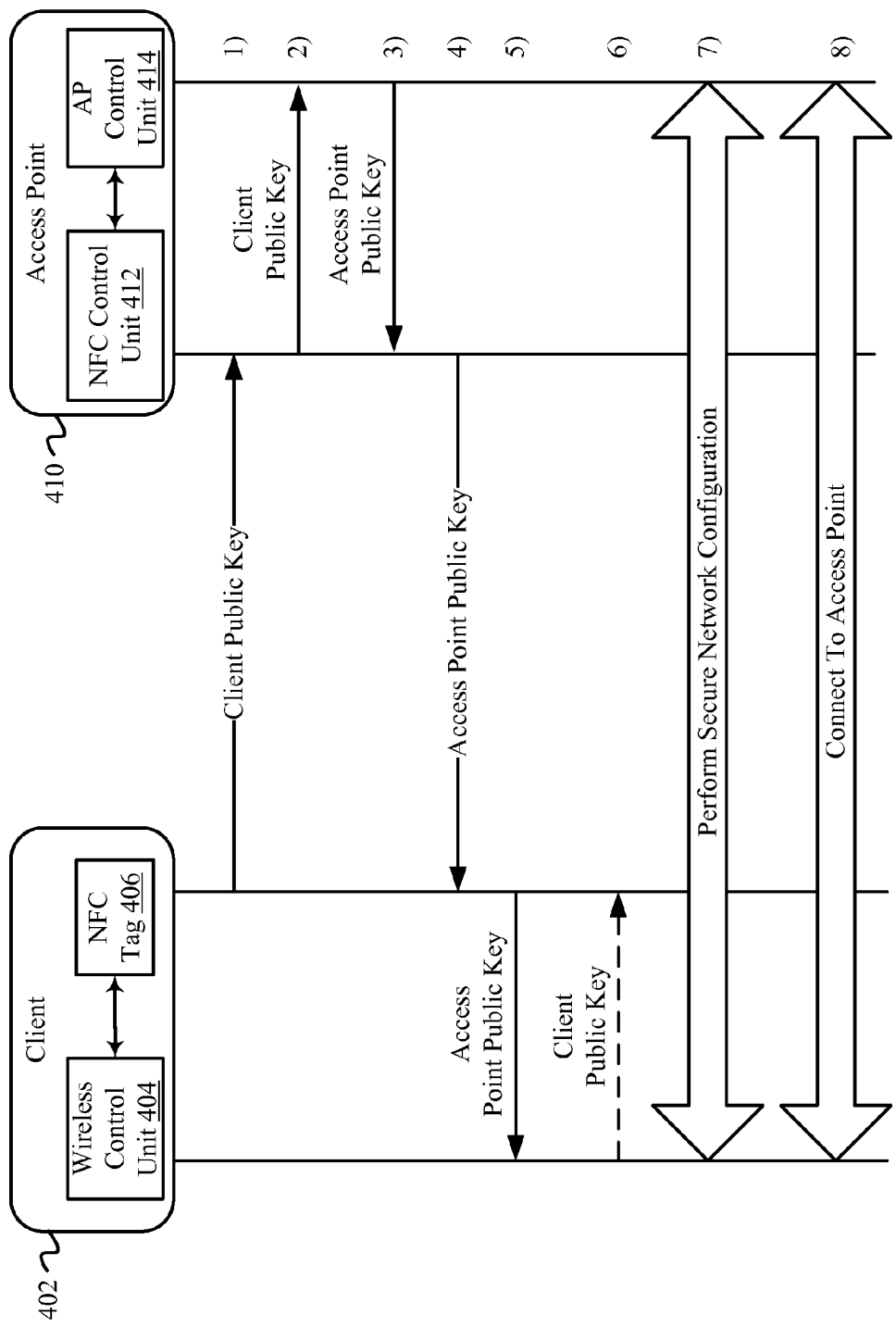
FIG. 4 is a sequence diagram depicting example interactions between a client and an access point to use NFC to facilitate and perform a secure network configuration.

FIG. 4 is a sequence diagram depicting example interactions between a client and an access point to use NFC to facilitate and perform a secure network configuration. FIG. 4 depicts a client 402 and an AP 410. The client 402 includes a wireless control unit 404 connected with an NFC tag 406. The AP 410 includes an NFC control unit 412 connected with an AP control unit 414. The client 402 and AP 410 described below may be examples of at least one aspect of the client and AP described with reference to FIGS. 1, 2, and/or 3.

To use NFC to perform a secure network configuration, a key exchange occurs between the client 402 and AP 410. At step 1, the client 402 public key is transferred from the client 402 to the AP 410. The NFC control unit 412 transmits a command indicating that the NFC tag 406 should transmit the client 402 public key. In some implementations, the NFC control unit 412 transmits the command that the NFC tag 406 should transmit the client 402 public key as the default RF field, as described above. In some implementations, the NFC control unit 412 transmits the indication that the NFC tag 406 should transmit the client 402 public key in response to receiving an indication that the client 402 is within range of AP 410. In some implementations, the indication that the client 402 is within range is the transmission of the client 402 public key by the NFC tag 406.

At step 2, the client 402 public key is transferred from the NFC control unit 412 to the AP control unit 414. In some implementations, the client 402 public key is transferred to the AP control unit 414 after it is written to the NFC control unit 412. In some implementations, the NFC control unit 412 writes the client 402 public key directly to the AP control unit 414. In some implementations, the AP control unit 414 reads the client 402 public key from the NFC control unit 412.

At step 3, the AP 410 public key is transferred from the AP control unit 414 to the NFC control unit 412. The AP control unit 414 may transfer the AP 410 public key in response to receiving the client 402 public key or in response to a specific request from the NFC control unit 412. In some implementations, the NFC control unit 412 reads the AP 410 public key from the AP control unit 414.

At step 4, the AP 410 public key is transferred from the AP 410 to the client 402. The NFC control unit 412 transmits a command indicating that data should be written to the NFC tag 406. The NFC control unit 412 also transmits the data representing the AP 410 public key with the command or separately. When the NFC tag 406 receives the command indicating that data representing the AP 410 public key should be written, the NFC tag 406 writes the data representing the AP 410 public key to memory.

At step 5, the AP 410 public key is transferred from the NFC tag 406 to the wireless control unit 404. In some implementations, the NFC tag 406 indicates to the wireless control unit 404 that the NFC tag 406 has written the AP 410 public key to memory. In some implementations, the NFC tag 406 writes the AP public key directly to memory located in the wireless control unit 404. In some implementations, the wireless control unit 404 reads data contained in the NFC tag 406 to determine if there is an AP 410 public key saved to the NFC tag 406.

At step 6, the client 402 optionally writes the client 402 public key to the NFC tag 406. The NFC tag 406 may include limited amounts of memory. For example, the NFC tag 406 may contain only enough memory to store a single public key. Thus, the NFC tag 406 stores the client 402 public key in the NFC tag 406 memory. When the NFC control unit 412 writes the AP 410 public key to the NFC Tag 406, the client 402 public key may be overwritten. Once the wireless control unit 404 reads the AP 410 public key from the NFC tag 406, the wireless control unit 404 writes the client 402 public key back into the NFC tag 406 memory.

At step 7, a secure network configuration is performed between the client 402 and the AP 410. The secure network configuration may be performed by exchanging configuration data and/or authentication data as described above. After the completion of step 7, the client 402 and AP 410 have exchanged public keys. Further, the client 402 and AP 410 used the public keys to exchange encrypted messages. The encrypted messages contain data allowing the client 402 to wirelessly access a network to which the AP 410 belongs.

At step 8, the client 402 uses the AP 410 configuration data to connect to the AP 410. For example, the client 402 might use the AP 410 configuration data to update the configuration for the wireless control unit 404. Once the configuration is updated, the wireless control unit 404 may then connect to the AP 410.

In some embodiments, an NFC-enabled registrar device may be used to facilitate the secure network configuration of a client. For example, smart appliances, such as smart refrigerators, may include wireless functionality. However, it may be inconvenient to move a device such as a refrigerator near enough to an AP to allow the use of NFC as described above. An NFC-enabled registrar device, however, may act as a middleman between an AP and the client.

Figure 5:
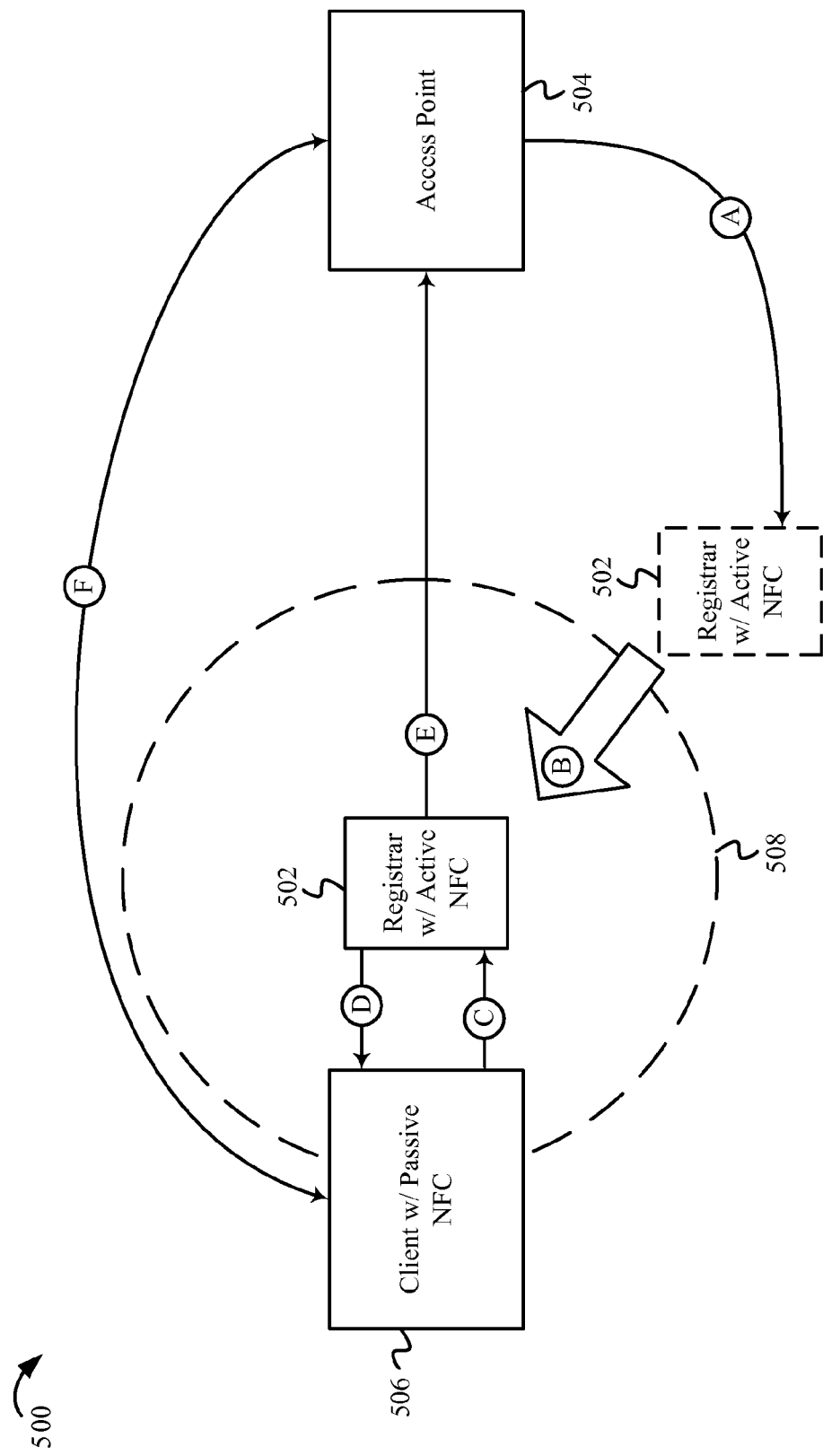
FIG. 5 depicts example interactions between a registrar, client and access point utilizing NFC to facilitate secure network configuration.

FIG. 5 depicts example interactions between a registrar, client and access point utilizing NFC to facilitate secure network configuration. FIG. 5 depicts a set of devices 500, including a registrar 502, an AP 504, and a client 506. The client 506 and AP 504 described below may be examples of at least one aspect of the client and AP described with reference to FIGS. 1, 2, 3, and/or 4. The registrar 502 includes active NFC capabilities with a range 508 depicted by the dashed line. The client 506 includes passive NFC capabilities. The registrar 502 may be any device that includes an active NFC implementation. The AP 504 is associated with a public-private key pair (not depicted). The client 506 is also associated with a public-private key pair (not depicted).

At stage A, the AP 504 transfers the AP 504 public key to the registrar 502. The technique used to transfer the AP 504 public key to the registrar 502 may vary between implementations. In some implementations, the registrar 502 is connected with the AP 504 using a wireless protocol such as Wi-Fi. The AP 504 may then transmit the AP 504 public key via the wireless protocol. In some implementations, the registrar 502 receives the AP 504 public key using NFC. In general, any technique that allows the transfer of the AP 504 public key to the registrar 502 may be used, including a wired connection, removable flash drives, etc.

At stage B, the registrar 502 is positioned such that the client 506 is within the range 508 of the registrar 502. Although depicted as moving the registrar 502 towards the client 506, the client 506 may be moved until within the range 508 while the registrar 502 remains in place. Similarly, both the registrar 502 and client 506 may be moved until the client 506 is within the range 508. The client 506 is within the range 508 when the RF field generated by the registrar 502 activates the NFC tag contained in the client 506.

At stage C, the client 506 transfers the client 506 public key to the registrar 502. To effectuate the transfer, the registrar 502 transmits a command to the client 506 indicating that the client 506 is to transmit the client 506 public key in response to the command. The client 506 transmits the client 506 public key to the registrar 502 utilizing power generated by the registrar 502 transmission.

At stage D, the registrar 502 transfers the AP 504 public key to the client 506. The registrar 502 transfers the AP 504 public key to the client 506 by transmitting a write command and data representing the AP 504 public key. The registrar 502 may transmit the write command and the data representing the AP 504 public key in individual transmissions or combined into a single transmission.

At stage E, the registrar 502 transfers the client 506 public key to the AP 504. The technique used by the registrar 502 to transfer the client 506 public key to the AP 504 may vary between implementations, as described above at stage A. Once the client 506 public key is transferred to the AP 504, the client 506 has the AP 504 public key and the AP 504 has the client 506 public key.

At stage F, the AP 504 and the client 506 perform a secure network configuration using the exchanged public keys. The secure network configuration is performed in a substantially similar manner as described at stage D of FIG. 1.

Figure 6:
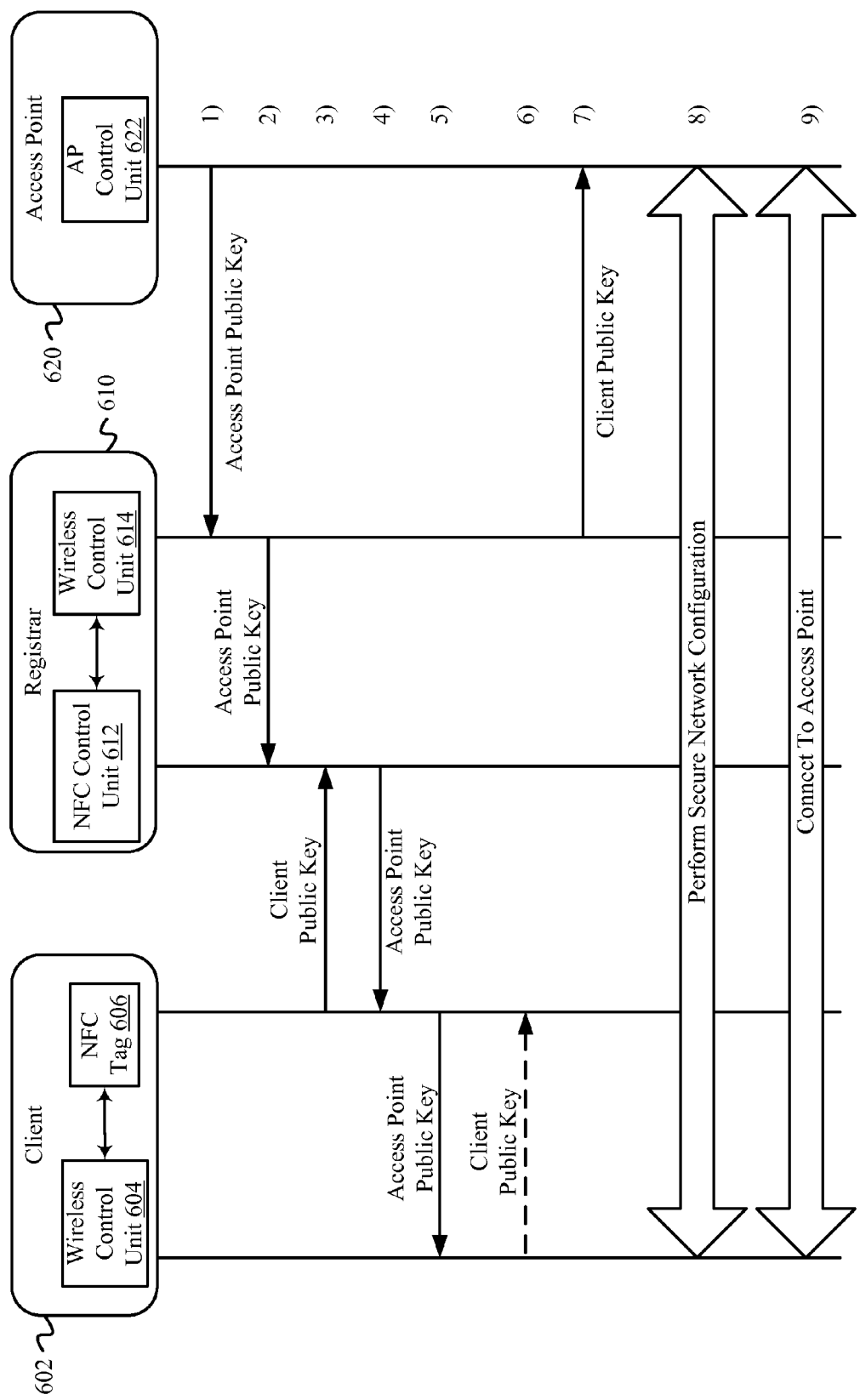
FIG. 6 is a sequence diagram depicting example interactions between a client, a registrar, and an access point using NFC to perform a secure network configuration.

FIG. 6 is a sequence diagram depicting example interactions between a client 602, a registrar 610, and an access point 620 using NFC to perform a secure network configuration. The client 602, registrar 610, and AP 620 described below may be examples of at least one aspect of the client, AP, and registrar described with reference to FIGS. 1, 2, 3, 4, and/or 5. The client 602 includes a wireless control unit 604 connected with an NFC tag 606. The registrar 610 includes an NFC control unit 612 connected with a wireless control unit 614. The NFC control unit 612 implements active NFC. The AP 620 includes an AP control unit 622.

To use the registrar 610 and NFC to facilitate a secure network configuration, a key is exchanged between the AP 620 and client 602 by way of the registrar 610. At step 1, the AP 620 public key is transferred from the AP 620 to the registrar 610. In the particular implementation depicted, the AP 620 transfers the AP 620 public key to the registrar 610 using a wireless protocol, such as Wi-Fi. More specifically, the AP control unit 622 transmits the AP 620 public key to the wireless control unit 614. However, the particular implementation may vary. For example, the AP 620 public key may be transmitted using a wired connection or another wireless protocol, such as NFC.

At step 2, the registrar 610 transfers the AP 620 public key from the wireless control unit 614 to the NFC control unit 612. The registrar 610 may transfer the AP 620 public key to the NFC control unit 612 immediately after receiving it at the wireless control unit 614, or may delay transferring the AP 620 public key until it has determined that the client 602 is within range.

At step 3, the client 602 public key is transferred from the client 602 to the registrar 610. In some implementations, the transfer of the client 602 public key from the client 602 to the registrar 610 may be initiated by the registrar 610 receiving an indication that the client 602 is within the range of the NFC control unit 612. In some implementations, the indication that the client 602 is within range of the NFC control unit 612 is the actual transfer of the client 602 public key. The NFC control unit 612 generates an RF signal that includes a command indicating that the NFC tag 606 should transmit the client 602 public key. The RF signal, or another RF signal transmitted by the NFC control unit 612 provides power for the NFC tag 606. The NFC tag 606, powered by an RF signal generated by the NFC control unit 612, transmits the client 602 public key in response. The NFC control unit 612 receives the client 602 public key transmitted by the NFC tag 606.

At step 4, the AP 620 public key is transferred from the registrar 610 to the client 602. The NFC control unit 612 transmits an RF signal that includes a command indicating that data should be written to the NFC tag 606. The NFC control unit 612 also transmits the data representing the AP 620 public key with the RF signal indicating that data should be written or as a separate RF signal. When the NFC tag 606 receives the command indicating that the data representing the AP 620 public key should be written, the NFC tag 606 writes the data representing the AP 620 public key to memory.

At step 5, the client 602 transfers the AP 620 public key from the NFC tag 606 to the wireless control unit 604. In some implementations, the NFC tag 606 indicates to the wireless control unit 604 that the NFC tag 606 has written the AP 620 public key to memory. In some implementations, the NFC tag 606 writes the AP public key directly to memory located in the wireless control unit 604. In some implementations, the wireless control unit 604 may read data contained in the NFC tag 606 to determine if there is an AP 620 public key saved to the NFC tag 606.

At step 6, the client optionally writes the client 602 public key to the NFC tag 606. As described above, the NFC tag 606 may be implemented such that the NFC tag 606 overwrites the memory location in which the client 602 public key is stored on the NFC tag 606 with the received AP 620 public key. Thus, after the wireless control unit 604 transfers the AP 620 public key at step 5, the wireless control unit 604 might write the client 602 public key to the NFC tag 606.

At step 7, the registrar 610 transfers the client 602 public key to the AP 620. The registrar 610 may transfer the client 602 public key to the AP 620 using the same technique as the AP 620 to transfer the AP 620 public key to the registrar 610 at step 1. The registrar 610 may use other techniques, such as described at step 1, to transfer the client 602 public key to the AP 620.

At step 8, the client 602 and the AP 620 perform a secure network configuration. The secure network configuration may be performed in a manner substantially similar to that described above. After the completion of step 8, the client 602 and AP 620 have exchanged public keys using the registrar 610. Further, the client 602 and AP 620 used the public keys to exchange encrypted messages. The encrypted messages contained data allowing the client 602 to access a wireless network to which the AP 620 belongs.

At step 9, the client 602 uses the AP 620 configuration data to connect to the AP 620. For example, the client 602 might use the AP 620 configuration data to update the configuration for the wireless control unit 604. Once the configuration is updated, the wireless control unit 604 may then connect to the AP 620.

In some embodiments, the number of interactions between an AP, a registrar and a client may be reduced by allowing the registrar to transfer the configuration data for the network to the client. For example, if the registrar wirelessly connects to the network associated with the AP, the registrar already includes the configuration information used to connect to the AP. Thus, instead of acting as an intermediary for the public key exchange between the AP and the client, the public key exchange is between the client and the registrar. After the public keys are exchanged between the client and the registrar, the registrar may then use the client's public key to encrypt the configuration data and transmit it to the client.

Figure 7:
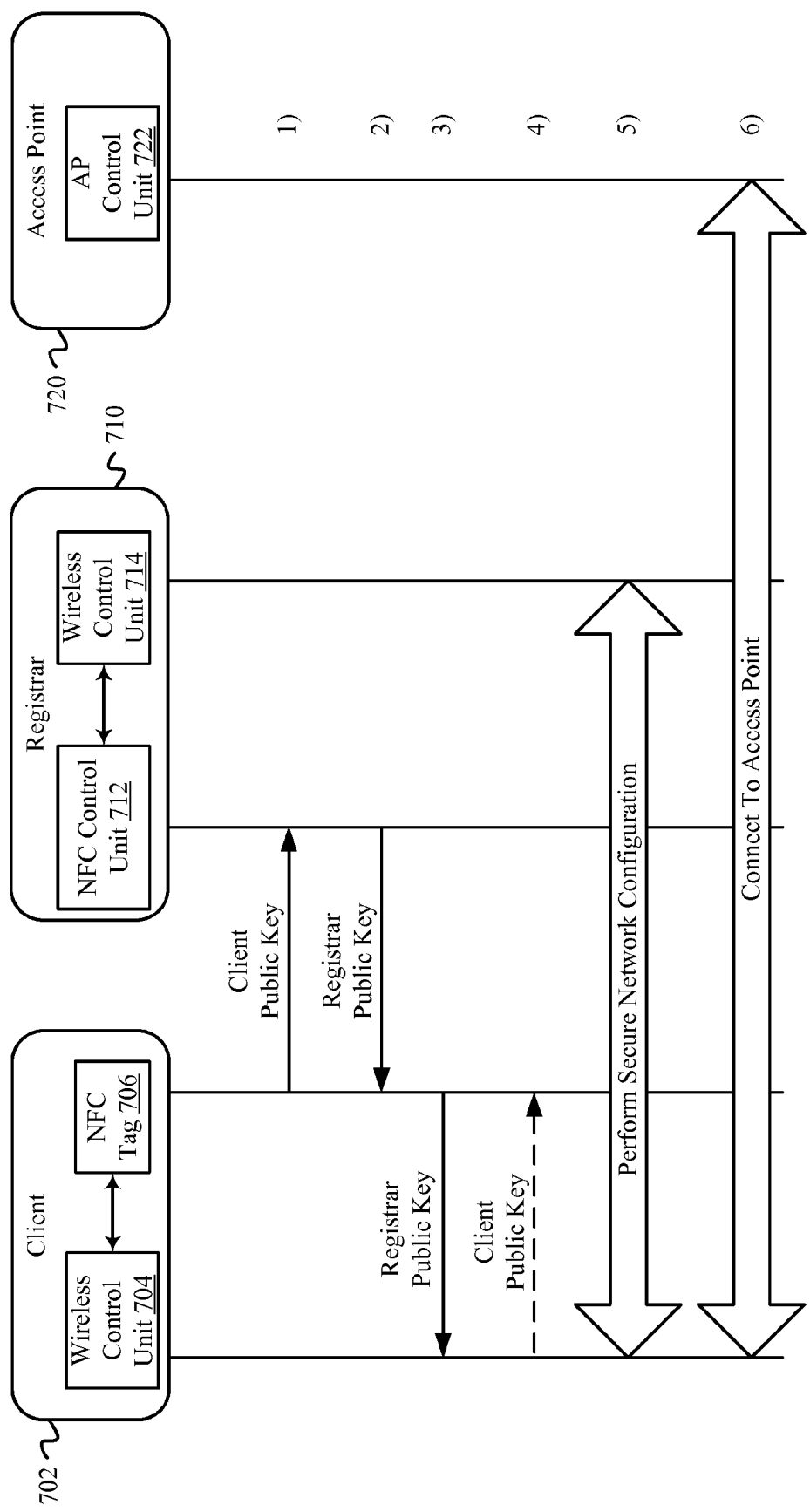
FIG. 7 is a sequence diagram depicting example interactions between a client, a registrar, and an access point using NFC to securely transfer a wireless configuration from the registrar to the client.

FIG. 7 is a sequence diagram depicting example interactions between a client, a registrar, and an AP using NFC to securely transfer a wireless configuration from the registrar to the client. FIG. 7 depicts a client 702, a registrar 710 and an AP 720. The client 702, registrar 710, and AP 720 described below may be examples of at least one aspect of the client, AP, and registrar described with reference to FIGS. 1, 2, 3, 4, 5, and/or 6. The client 702 includes a wireless control unit 704 connected with an NFC tag 706. The registrar 710 includes an NFC control unit 712 connected with a wireless control unit 714. The NFC control unit 712 implements active NFC. The AP 720 includes an AP control unit 722.

To use the registrar 710 and NFC to facilitate the transfer of the wireless configuration from the registrar 710 to the client 702, a key is exchanged between the registrar 710 and client 702. At step 1, the client 702 public key is transferred from the client 702 to the registrar 710. In some implementations, the transfer of the client 702 public key from the client 702 to the registrar 710 may be initiated by the registrar 710 receiving an indication that the client 702 is within the range of the NFC control unit 712. In some implementations, the indication that the client 702 is within range of the NFC control unit 712 is the actual transfer of the client 702 public key. The NFC control unit 712 generates an RF signal that includes a command indicating that the NFC tag 706 should transmit the client 702 public key. The RF signal, or another RF signal transmitted by the NFC control unit 712 provides power for the NFC tag 706. The NFC tag 706, powered by an RF signal generated by the NFC control unit 612, transmits the client 702 public key in response. The NFC control unit 712 receives the client 702 public key transmitted by the NFC tag 706.

At step 2, the registrar 710 public key is transferred from the registrar 710 to the client 702. The NFC control unit 712 transmits an RF signal that includes a command indicating that data should be written to the NFC tag 706. The NFC control unit 712 also transmits the data representing the registrar 710 public key with the RF signal indicating that data should be written or as a separate RF signal. When the NFC tag 706 receives the command indicating that the data representing the registrar 710 public key should be written, the NFC tag 706 writes the data representing the registrar 710 public key to memory.

At step 3, the client 702 transfers the registrar 710 public key from the NFC tag 706 to the wireless control unit 704. In some implementations, the NFC tag 706 indicates to the wireless control unit 704 that the NFC tag 706 has written the registrar 710 public key to memory. In some implementations, the NFC tag 706 writes the registrar 710 public key directly to memory located in the wireless control unit 704. In some implementations, the wireless control unit 704 may read data contained in the NFC tag 706 to determine if there is a registrar 710 public key saved to the NFC tag 706.

At step 4, the client optionally writes the client 702 public key to the NFC tag 706. As described above, the NFC tag 706 may be implemented such that the NFC tag 706 overwrites the memory location in which the client 702 public key is stored on the NFC tag 706 with the received registrar 710 public key. Thus, after the wireless control unit 704 transfers the registrar 710 public key at step 3, the wireless control unit 704 might write the client 702 public key to the NFC tag 706.

At step 5, the registrar 710 and the client 702 perform a secure network configuration. The secure network configuration may be performed in a manner substantially similar to that described above. In some implementations, the transfer of the AP 720 configuration data is performed over a wireless connection, as depicted. For example, after a public key exchange between the registrar 710 and the client 702, the registrar 710 may create an ad hoc wireless network with the client 702, or vice versa. Similarly, the registrar 710 and client 702 may perform a WPS to establish a connection. In some implementations, the transfer of the AP 720 configuration data is performed using NFC, similar to the public key exchange. Any other technique used to exchange data between two devices may be used to transfer the AP 720 configuration data from the registrar 710 and client 702. The registrar 710 uses the client 702 public key to encrypt the AP 720 configuration data prior to transmitting it. In some implementations, the client 702 public key is used to establish a secure connection between the registrar 710 and the client 702, allowing the AP 720 configuration data to be transferred securely without encrypting the actual AP 720 configuration data.

At step 6, the client 702 uses the AP 720 configuration data to connect to the AP 720. For example, the client 702 might use the AP 720 configuration data to update the configuration for the wireless control unit 704. Once the configuration is updated, the wireless control unit 704 may then connect to the AP 720 without performing a secure network configuration with the AP 720.

FIG. 7 does not depict any interaction between the AP 720 and the registrar 710. It is assumed that the registrar 710 was previously connected to the AP 720. The registrar 710 could have been configured as described in the embodiments associated with FIGS. 1-4. The registrar 710 could also connect to the AP 720 manually, such as by a user entering in the appropriate configuration information into the registrar 710. Thus, in some implementations data might have been exchanged between the registrar 710 and the AP 720 before the interactions depicted in FIG. 7. In some implementations, no data is exchanged between the registrar 710 and the AP 720 without user intervention.

Figure 8:
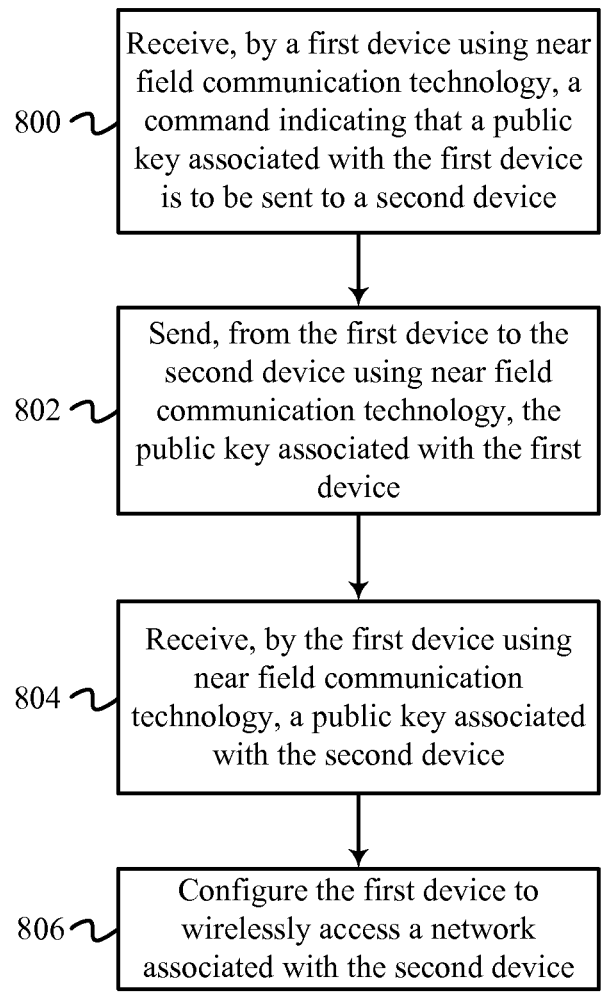
FIG. 8 depicts a flowchart illustrating an embodiment of a method for configuring a first device with a public key associated with a second device.

FIG. 8 depicts a flowchart illustrating an embodiment of a method for configuring a first device with a public key associated with a second device. For clarity, the method is described below with reference to the flowcharts and devices shown in FIGS. 1, 2, 3, 4, 5, 6, and 7.

In one embodiment, at block 800, the first device may receive, using near field communication technology, a command indicating that a public key associated with the first device is to be sent to the second device. At block 802, the first device may send, using near field communication technology, the public key associated with the first device to the second device. At block 804, the first device may receive, using near field communication technology, a public key associated with the second device. At block 806, the first device may wirelessly access a network associated with the second device.

Although FIG. 4, FIG. 6, and FIG. 7, as sequence diagrams, present operations in a particular order, different implementations may support operations in other orders. For example, in FIG. 4 the NFC control unit 412 reads the client 402 public key before writing the AP 410 public key (step 1 and step 4, respectively). This particular order facilitates an implementation in which the NFC tag 406 only includes enough memory to store one public key. However, it is possible to implement the devices such that the AP 410 public key is written before the client 402 public key is read.

As example flowcharts, the flowcharts depicted above present operations in an example order from which embodiments may deviate (e.g., operations may be performed in a different order than illustrated and/or in parallel). For example, in FIG. 3, the client may receive the NFC command to transfer the client public key (block 300) after receiving the public key associated with the AP (block 304).

While the examples herein generally refer to a client and an AP, the subject matter applies to two clients as well. An AP is merely a specific type of client, and many clients may act as APs as well. For example, two clients may establish a connection between each other. Neither client may be acting as an AP. More particularly, the subject matter applies to any device implemented with the above described capabilities, regardless of a particular label applied to a particular device.

Further, while an NFC implementation that uses RF signals is described, the subject matter applies to the use of other forms of electromagnetic radiation. For example, signals based on infrared radiation, microwave radiation, visible light (such as laser), etc. may be used instead of RF signals.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the subject matter may take the form of a computer program product embodied in any tangible medium of expression having computer usable program code embodied in the medium. The described embodiments may be provided as a computer program product, or software, that may include a machine-readable storage medium having stored thereon instructions, which may be used to program a computer system (or other electronic device(s)) to perform a process according to embodiments, whether presently described or not, since every conceivable variation is not enumerated herein. A machine readable storage medium includes any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. A machine-readable storage medium does not encompass signals. Embodiments, however, may be embodied in a machine-readable signal medium. Examples of a machine-readable signal medium include an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 9:
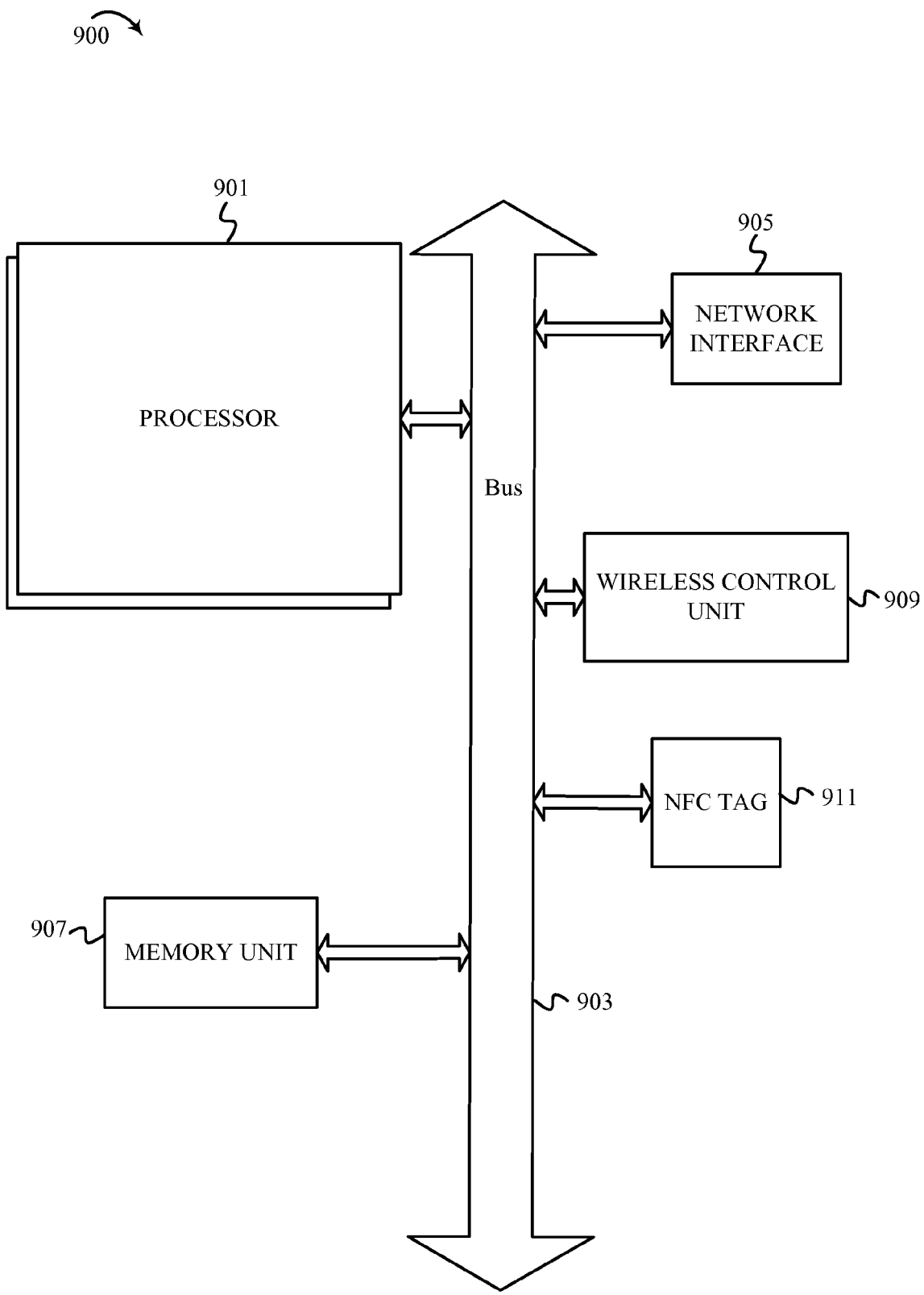
FIG. 9 depicts an example device for implementing a secure network configuration.

FIG. 9 depicts an example device 900 for implementing a secure network configuration. The example device 900 may include a wireless control unit and an NFC tag. The device 900 described below may be an example of at least one aspect of the client, AP, and/or registrar described with reference to FIGS. 1, 2, 3, 4, 5, 6, and/or 7. The device 900 includes a processor 901 (possibly including multiple processors, multiple cores, multiple nodes, and/or implementing multi-threading, etc.). The device 900 includes memory unit 907. The memory unit 907 may be system memory (e.g., cache, SRAM, DRAM, zero capacitor RAM, Twin Transistor RAM, eDRAM, EDO RAM, DDR RAM, EEPROM, NRAM, RRAM, SONOS, PRAM, etc.) or any of the above already described possible realizations of machine-readable storage media. The device 900 also includes a bus 903 (e.g., PCI, ISA, PCI-Express, Hyper-Transport®, InfiniBand®, NuBus, etc.) and a network interface 905 (e.g., an ATM interface, an Ethernet interface, a Frame Relay interface, SONET interface, wireless interface, etc.). The device 900 also includes a wireless control unit 909 and NFC tag 911. The wireless control unit 909 and the NFC tag 911 embody functionality to implement embodiments described above. The wireless control unit 909 and the NFC tag 911 may include functionalities that facilitate a public key exchange using passive NFC. The wireless control unit 909 and the NFC tag 911 may also include functionalities that facilitate the configuration of the device 900 based on the exchange of public keys. Any one of these functionalities may be partially (or entirely) implemented in hardware and/or on the processor 901. For example, the functionality may be implemented with an application specific integrated circuit, in logic implemented in the processor 901, in a co-processor on a peripheral device or card, etc. Further, realizations may include fewer or additional components not illustrated in FIG. 9 (e.g., video cards, audio cards, additional network interfaces, peripheral devices, etc.). The processor 901 and the network interface 905 are coupled to the bus 903. Although illustrated as being coupled to the bus 903, the memory unit 907 may be coupled to the processor 901. Further, while the wireless control unit 809 is depicted separate from the network interface 905, the wireless control unit 909 may be part of the network interface 905 or function as the network interface 905 itself.

While the embodiments are described with reference to various implementations and exploitations, it will be understood that these embodiments are illustrative and that the scope of the claims is not limited to them. In general, techniques for using NFC to configure devices as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the claims. In general, structures and functionality presented as separate components in the example configurations may be implemented as a combined structure or component. Similarly, structures and functionality presented as a single component may be implemented as separate components. These and other variations, modifications, additions, and improvements may fall within the scope of the claims.

What is claimed is:

1. A method comprising:
receiving, by a first device and by using near field communications, a command indicating that a public key associated with the first device is to be sent to an access point that is associated with an access network, wherein the first device and the access point are associated with public-private key pairs;
sending, by the first device and by using near field communications, the public key associated with the first device to the access point;
receiving, by the first device and by using near field communications, a public key associated with the access point and encrypted authentication data associated with the access network; and
configuring, based at least in part on receiving the public key associated with the access point and the encrypted authentication data associated with the access network, the first device to wirelessly connect to the access network associated with the access point.

2. The method of claim 1, wherein the encrypted authentication data associated with the access network is encrypted using the public key associated with the first device.

3. The method of claim 1, wherein the encrypted authentication data associated with the access network is encrypted using a shared secret key derived from at least the public key associated with the first device.

4. The method of claim 2, wherein the encrypted authentication data comprises at least one of a username, or a password, or an encryption key, or a pre-shared key, or a combination thereof.

5. The method of claim 2, wherein configuring the first device to wirelessly connect to the access network based, at least in part, on the encrypted authentication data comprises:
decrypting, by the first device, the encrypted authentication data associated with the access network, the encrypted authentication data being decrypted using a private key associated with the first device;
encrypting, by the first device, a message using the public key associated with the access point; and
sending, from the first device, the encrypted message.

6. The method of claim 2, wherein configuring the first device to wirelessly connect to the access network based, at least in part, on the encrypted authentication data comprises:
decrypting, by the first device, the encrypted authentication data associated with the access network, the encrypted authentication data being decrypted using a shared secret key, wherein the shared secret key is derived from at least the public key associated with the access point;
encrypting, by the first device, a message using the shared secret key associated with the access point, the message including data for allowing the first device to wirelessly connect to the access network associated with the access point; and
sending, from the first device, the encrypted message.

7. The method of claim 1, wherein configuring the first device to wirelessly connect to the access network associated with the access point comprises:
generating, by the first device, first authentication data associated with the access network, the first authentication data being generated by the first device based at least in part on the public key associated with the access point and the first authentication data being different from the encrypted authentication data associated with the access network.

8. The method of claim 1, wherein configuring the first device to connect to the access network associated with the access point comprises:
receiving, by the first device, configuration data associated with a third device;
configuring the first device to connect to the third device;
receiving, by the first device, configuration data associated with the access point; and
configuring the first device to wirelessly connect to the access network associated with the access point, based, at least in part, on the configuration data associated with the access point.

9. The method of claim 1, wherein the first device is powered, at least in part, by a radio frequency signal transmitted by the access point, and wherein configuring the first device to connect to the access network associated with the access point further comprises:
initiating, based at least in part on powering the first device different from the radio frequency signal transmitted by the access point, the configuration of the first device to connect to the access network associated with the access point.

10. The method of claim 1, wherein:
the sending the public key associated with the first device to the access point comprises sending, by the first device and by using near field communications, the public key associated with the first device to a third device in communication with the access point, wherein the first device comprises a near field communication tag and the near field communication tag is powered by a radio frequency signal transmitted by the third device; and
the receiving the public key associated with the access point and the encrypted authentication data associated with the access network comprises receiving, by the first device and by using near field communications, the public key associated with the access point and the encrypted authentication data associated with the access network from the third device.

11. The method of claim 1, wherein the first device comprises a near field communication tag and a wireless control unit.

12. The method of claim 11, wherein sending, by the first device and by using near field communications, the public key associated with the first device comprises transmitting, by the near field communication tag, the public key associated with the first device, wherein the near field communication tag is powered by a radio frequency signal transmitted by the access point.

13. The method of claim 11, wherein receiving, by the first device and by using near field communications, the public key associated with the access point comprises writing the public key associated with the access point to memory on the near field communication tag.

14. A device comprising:
a near field communication tag to:
receive, using near field communications, a command indicating that a public key associated with the device is to be sent to a wireless access point that is associated with an access network, wherein the device and the wireless access point are associated with public-private key pairs;

send, using near field communications, the public key associated with the device to the wireless access point; and receive, using near field communications, a public key associated with the wireless access point and encrypted authentication data associated with the access network; and a wireless control unit to:

configure, based at least in part on receiving the public key associated with the wireless access point and the encrypted authentication data associated with the access network, the device to wirelessly connect to Flail the access network associated with the wireless access point, wherein the wireless control unit is coupled with the near field communication tag.

15. The device of claim 14, wherein the encrypted authentication data associated with the access network is encrypted using the public key associated with the device.

16. The device of claim 14, wherein the encrypted authentication data associated with the access network is encrypted using a shared secret key derived from at least the public key associated with the device.

17. The device of claim 15, wherein the encrypted authentication data comprises at least one of a username, or a password, or an encryption key, or a pre-shared key, or a combination thereof.

18. The device of claim 15, wherein the wireless control unit to configure the device to wirelessly connect to the access network associated with the wireless access point comprises the wireless control unit to:

decrypt the encrypted authentication data associated with the access network, the encrypted authentication data being decrypted using a private key associated with the device;

encrypt a message using the public key associated with the wireless access point; and send the encrypted message.

19. The device of claim 15, wherein the wireless control unit to configure the device to wirelessly connect to the access network associated with the wireless access point comprises the wireless control unit to:

decrypt the encrypted authentication data associated with the access network, the encrypted authentication data being decrypted using a shared secret key, the shared secret key is derived from at least the public key associated with the wireless access point;

encrypt a message using the shared secret key associated with the wireless access point, the message including data for allowing the device to wirelessly connect to the access network associated with the wireless access point; and send the encrypted message.

20. The device of claim 14, wherein the wireless control unit to configure the device to wirelessly connect to the access network associated with the wireless access point comprises the wireless control unit to:

generate first authentication data associated with the access network, the first authentication data being generated based at least in part on the public key associated with the wireless access point and the first authentication data being different from the encrypted authentication data associated with the access network.

21. The device of claim 14, wherein the wireless control unit to configure the device to wirelessly connect to the access network associated with the wireless access point comprises the wireless control unit to:

receive configuration data associated with a third device;

configure the device to connect to the third device;

receive configuration data associated with the wireless access point; and configure the device to wirelessly connect to the access network associated with the wireless access point, based, at least in part, on the configuration data associated with the wireless access point.

22. The device of claim 14, wherein the near field communication tag is powered by a radio frequency signal transmitted by the wireless access point.

23. The device of claim 14, wherein the near field communication tag is further configured to:

write the public key associated with the wireless access point to memory on the near field communication tag.

24. The device of claim 14, wherein the wireless control unit is further configured to:

read the public key associated with the wireless access point from the near field communication tag.

25. The device of claim 14, wherein the wireless control unit is further configured to:

write the public key associated with the device to the near field communication tag.

26. A device comprising:

means for receiving, using near field communications, a command indicating that a public key associated with the device is to be sent to a wireless access point that is associated with an access network, wherein the device and the wireless access point are associated with public-private key pairs;

means for sending, using near field communications, the public key associated with the device to the wireless access point;

means for receiving, using near field communications, a public key associated with the wireless access point and encrypted authentication data associated with the access network; and means for configuring, based at least in part on the receiving the public key associated with the wireless access point and the encrypted authentication data associated with the access network, the device to wirelessly connect to the access network associated with the wireless access point.

27. The device of claim 26, wherein the encrypted authentication data associated with the access network is encrypted using the public key associated with the device.

28. The device of claim 27, wherein the means for configuring the device to wirelessly connect to the access network associated with the wireless access point comprises:

means for decrypting the encrypted authentication data associated with the access network, the encrypted authentication data being decrypted using a private key associated with the device;

means for encrypting a message using the public key associated with the wireless access point; and means for sending the encrypted message.

29. A non-transitory computer-readable medium storing instructions executable by a processor to:

receive, using near field communication technology, a command indicating that a public key associated with a first device is to be sent to an access point that is associated with an access network, wherein the first device and the access point are associated with public-private key pairs;

send, using near field communications, the public key associated with the first device to the access point;

receive, using near field communications, a public key associated with the access point and encrypted authentication data associated with the access network; and configure, based at least in part on receiving the public key associated with the access point and the encrypted authentication data associated with the access network, the first device to wirelessly connect to the access network associated with the access point.

30. The non-transitory computer-readable medium of claim 29, wherein the encrypted authentication data associated with the access network is encrypted using the public key associated with the first device.

\* \* \* \* \*